Nov. 6, 1962   A. J. HIRST   3,062,072
TORSIONAL VIBRATION DAMPERS
Filed April 24, 1961
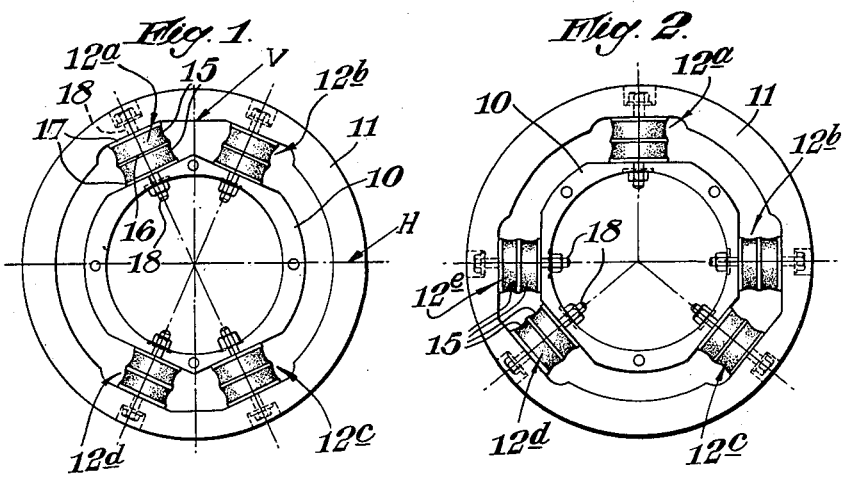
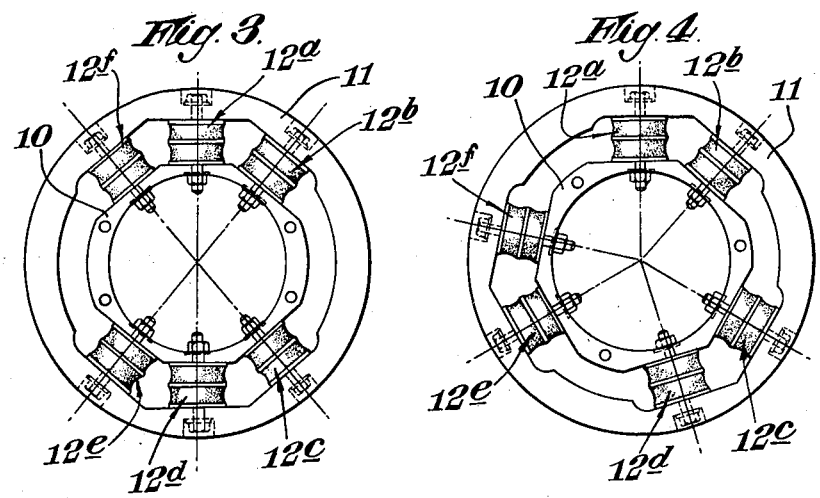

3,062,072
Patented Nov. 6, 1962

3,062,072
TORSIONAL VIBRATION DAMPERS
Archie John Hirst, Leicestershire, England, assignor to Metalastik Limited, Leicestershire, England, a British company
Filed Apr. 24, 1961, Ser. No. 104,946
Claims priority, application Great Britain May 20, 1960
4 Claims. (Cl. 74—574)

This invention concerns torsional vibration dampers for the propeller shafts of motor vehicles.

In United States Patent No. 2,834,226 there is described and claimed a torsional vibration damper for damping torsional vibrations in motor vehicle propeller shafts, the damper comprising a ring-like inertia member, a hub member co-axial within the inertia member and spaced therefrom to define an annular space, the hub member being adapted to constitute a part of the propeller shaft transmission, and three or more equi-spaced rubber or the like vibration-damping elements each extending radially across the annular space from the hub to the inertia members between which it is clamped.

The present invention provides an improvement in or a modification of a torsional vibration damper as set forth above which consists broadly in that the vibration damping elements are non-uniformly spaced.

A damper according to the present invention may be employed where the fitting of a damper having equi-spaced vibration damping elements is impracticable, inconvenient or impossible.

Also, the arrangement of the vibration damping elements may be such as to provide a non-uniform radial stiffness for the damper as may be required in certain applications.

More particularly, according to a feature of the present invention a torsional vibration damper comprises a ring-like inertia member, a hub member within the inertia member and spaced therefrom to define an annular space, said hub member being adapted to constitute a part of the propeller shaft transmission, and at least four rubber or the like vibration damping elements each extending radially across the annular space from the hub member to the inertia member and held clamped between the hub and the inertia member in radial precompression, at least one adjacent pair of said damping elements being angularly spaced by a greater or lesser angle than two other adjacent pairs of said damping elements, and the damping elements being arranged so that the forces of precompression in the damping elements maintain the inertia member co-axial with the hub member.

An arrangement of vibration damping elements as just defined is a balanced arrangement. If the vibration damping elements are not held clamped between the hub member and the inertia member in radial pre-compression however, a balanced arrangement of the vibration damping elements in themselves is unnecessary the torsional vibration damper being balanced for example by the addition of one or more balance weights to the inertia member.

The accompanying figures of drawing each show, diagrammatically, by way of example only, a different embodiment of torsional vibration damper according to the present invention in which the vibration damping elements are held clamped in radial precompression between the hub member and the inertia member.

In the figures of drawing the hub member, the ring-like inertia member and the vibration damping elements are indicated respectively by the reference numerals 10, 11 and 12a, 12b . . . .

As may be seen from the drawings, the hub member 10 is, in each case, within the inertia member 11 and spaced therefrom to define an annular space, and the vibration damping elements, which in the present examples are in the form of bobbins, extend radially across the annular space from the hub member to the inertia member.

Each bobbin conveniently comprises a pair of rubber or like discs 15 and a metal interleaf 16 and metal end plates 17 bonded to the rubber discs to constitute a preformed assembly.

The bobbins are clamped between the hub member and the inertia member in radial precompression, and secured by studs 18, the inner studs being fixed in axially directed slots in the hub member to facilitate assembly.

The vibration damper shown in FIG. 1 has four bobbins 12a . . . d of which the pair of adjacent bobbins 12a, 12b are angularly spaced by a lesser amount than the adjacent pairs of bobbin, 12b, 12c, and 12d, 12a. The bobbins are arranged in two pairs 12a, 12c and 12b, 12d each pair at the opposite ends of a diameter of the damper.

With this arrangement, as with all the other arrangements to be described, the forces of precompression in the bobbins maintain the inertia member 11 co-axial with the hub member 10. Furthermore the radial stiffness of the damper in directions along the vertical diameter V in FIG. 1 is greater than the radial stiffness of the damper in directions along the horizontal diameter 21 in FIG. 1 depending upon the difference in spacing between the bobbins 12a, 12b and 12b, 12c.

In FIG. 2 five bobbins are provided indicated respectively by the reference numerals 12a to 12e. The adjacent pair of bobbins 12c, 12d are spaced at a greater angle than any other adjacent pair of the bobbins. The bobbins 12a, 12c and 12d are equi-spaced at 120° and the remaining bobbins 12b and 12e are at opposite ends of the horizontal diameter of the damper in the figure. With this arrangement the radial stiffness of the damper in directions along the vertical diameter in the figure is less than in directions along the horizontal diameter in the figure.

In FIGS. 3 and 4 six bobbins are provided indicated respectively by the reference numerals 12a to 12f. With the FIG. 3 arrangement, the adjacent pair of bobbins 12a, 12b are spaced at a lesser angle than the adjacent pairs 12b, 12c and 12e, 12f but at the same angle as the adjacent pairs 12f, 12a and 12c, 12d and 12d, 12e, the bobbins being arranged in pairs 12a, 12d and 12b, 12e and 12c, 12f with each pair at opposite ends of a diameter of the damper. This arrangement gives rise to a greater radial stiffness vertically than horizontally in the figure.

The arrangement of bobbins in FIG. 4 is different in that the bobbins are arranged in superimposed patterns of three equi-spaced bobbins 12a, 12c, 12e, and 12b, 12d, 12f respectively, the adjacent pair of bobbins 12a, 12b being spaced at a lesser angle than the adjacent pairs of bobbins 12b, 12c and 12d, 12e and 12f, 12a but at the same angle, obviously, as the adjacent pairs 12c, 12d and 12e, 12f.

With the FIG. 4 construction an unequal spacing of the bobbins is achieved with a radial stiffness for the damping which is the same in all directions.

With all the constructions described a balanced arrangement of bobbins is provided.

I claim:
1. A torsional vibration damper for the propeller shaft of a motor vehicle, comprising a ring-like inertia member, a hub member co-axial within the inertia member and spaced therefrom to define an annular space, and at least four rubber or the like torsional vibration damping elements each extending radially across the annular space from the hub member to the inertia member and held clamped between the hub and the inertia member in radial precompression, at least one adjacent pair of said damp- ing elements being angularly spaced by a greater or lesser angle than two other adjacent pairs of said damping elements, and the damping elements being arranged so that the forces of precompression in the damping elements maintain the inertia member co-axial with the hub member.

2. A torsional vibration damper as claimed in claim 1, wherein an even number of said torsional vibration damping elements is provided arranged in pairs with each pair at opposite ends of a diameter of the damper.

3. A torsional vibration damper as claimed in claim 1, wherein an odd number of said torsional vibration damping elements is provided, three of the elements being equi-angularly spaced, and the remaining elements being arranged in pairs with each pair on opposite ends of a diameter.

4. A torsional vibration damper as claimed in claim 1, wherein an even number of said torsional vibration elements is provided the torsional vibration damping elements being arranged in superposed patterns of equi-spaced elements.

References Cited in the file of this patent
UNITED STATES PATENTS

| | | |
|---|---|---|
| 1,847,181 | Harrison | Mar. 1, 1932 |
| 2,313,024 | Salomon | Mar. 2, 1943 |
| 2,834,226 | Hirst | May 13, 1958 |